United States Patent
Huang et al.

(10) Patent No.: US 8,472,214 B2
(45) Date of Patent: Jun. 25, 2013

(54) CONTROL CIRCUIT AND METHOD FOR EFFICIENT FLYBACK POWER CONVERTER UNDER LIGHT LOAD

(75) Inventors: Pei-Lun Huang, Zhubei (TW);
Yu-Ming Chen, Hsinchu (TW);
Tzu-Chen Lin, Taipei (TW)

(73) Assignee: Richtek Technology Corp., Chupei, Hsinchu (TW)

( * ) Notice: Subject to any disclaimer, the term of this patent is extended or adjusted under 35 U.S.C. 154(b) by 730 days.

(21) Appl. No.: 12/500,019

(22) Filed: Jul. 9, 2009

(65) Prior Publication Data
US 2010/0008110 A1 Jan. 14, 2010

(30) Foreign Application Priority Data
Jul. 11, 2008 (TW) .............................. 97126459 A

(51) Int. Cl.
*H02M 3/335* (2006.01)
(52) U.S. Cl.
USPC .................. 363/21.18; 636/21.12; 636/21.15; 636/21.16; 636/21.17
(58) Field of Classification Search
USPC .................. 363/21.12, 21.15–21.18
See application file for complete search history.

(56) References Cited

U.S. PATENT DOCUMENTS

| | | | | |
|---|---|---|---|---|
| 4,456,872 A * | 6/1984 | Froeschle | ...................... | 323/286 |
| 6,049,471 A * | 4/2000 | Korcharz et al. | ............... | 363/20 |
| 6,385,059 B1 * | 5/2002 | Telefus et al. | ............... | 363/21.15 |
| 7,362,592 B2 * | 4/2008 | Yang et al. | ................... | 363/21.13 |
| 7,701,305 B2 * | 4/2010 | Lin et al. | ........................ | 331/143 |
| 7,778,051 B2 * | 8/2010 | Yang | .......................... | 363/21.18 |
| 7,808,802 B2 * | 10/2010 | Cai | ............................. | 363/21.12 |
| 8,018,741 B2 * | 9/2011 | Huynh et al. | ................. | 363/21.01 |
| 8,018,743 B2 * | 9/2011 | Wang et al. | .................. | 363/21.18 |
| 2008/0259655 A1 * | 10/2008 | Wei et al. | ................... | 363/21.18 |
| 2008/0310194 A1 * | 12/2008 | Huang et al. | ................. | 363/21.18 |
| 2010/0110735 A1 * | 5/2010 | Duan et al. | .................. | 363/21.18 |

* cited by examiner

*Primary Examiner* — Adolf Berhane
*Assistant Examiner* — Gary Nash
(74) *Attorney, Agent, or Firm* — Muncy, Geissler, Olds & Lowe, PLLC

(57) ABSTRACT

A flyback power converter includes a power switch connected to a primary side of a transformer, and a sensing signal is provided for a control circuit to switch the power switch so as for the transformer to convert an input voltage into an output voltage. The sensing signal is a function of the input voltage, and the control circuit extracts a variation of the sensing signal during a preset time period. The variation of the sensing signal is used to prevent the output ripple and the green mode entry point of the flyback power converter from varying with the input voltage.

19 Claims, 14 Drawing Sheets

CONTROL CIRCUIT AND METHOD FOR EFFICIENT FLYBACK POWER CONVERTER UNDER LIGHT LOAD

FIELD OF THE INVENTION

The present invention is related generally to a flyback power converter and, more particularly, to a control circuit and method for a flyback power converter.

BACKGROUND OF THE INVENTION

FIG. 1 is a circuit diagram of a conventional current mode flyback power converter 10, in which a rectifier 12 is configured to rectify an alternating current (AC) line voltage Vac to produce a direct current (DC) input voltage Vin applying to a primary side of a transformer 14, a current sense resistor Rcs is serially connected to a power switch 18 to sense a current I1 in the power switch 18 to thereby obtain a sensing signal Vcs, a control circuit 16 generates a control signal VGATE according to the sensing signal Vcs and a feedback signal Vcomp to switch the power switch 18 so as for the transformer 14 to convert the input voltage Vin into an output voltage Vo, and an opto-coupler 20 detects the output voltage Vo to generate the feedback signal Vcomp for the control circuit 16. At light load, the power converter 10 will have lower efficiency due to the switching loss of the power switch 18. In order to improve the efficiency of the power converter 10 at light load, a green mode, for example a burst mode and frequency modulation, is incorporated into the control circuit 16 to reduce the average switching frequency and thereby the switching loss at light load.

FIG. 2 is a circuit diagram of a conventional control circuit 16 having a burst mode, in which a power-saving circuit 22 for controlling the power converter 10 to enter the burst mode includes a hysteresis comparator 24 for generating a mask signal Smask according to the feedback signal Vcomp and a preset voltage Burst_level to mask a clock CLK by an AND gate 26, a pulse width modulation (PWM) circuit 28 includes a comparator 30 for comparing the sensing signal Vcs with the feedback signal Vcomp to generate a comparison signal Sc, and a flip-flop 32 for generating the control signal VGATE according to an output of the AND gate 26 and the comparison signal Sc. FIG. 3 is waveform diagram of the control circuit 16 shown in FIG. 2, in which waveform 34 represents load, waveform 36 represents the feedback signal Vcomp, and waveform 38 represents the control signal VGATE. Referring to FIGS. 2 and 3, during normal operation, i.e. at heavy load, as indicated from time t1 to time t2, the feedback signal Vcomp is greater than voltages VBURH and VBURL, as shown by the waveform 36, so that the mask signal Smask provided by the hysteresis comparator 24 is high and therefore, the clock CLK is not masked, and in consequence the control signal VGATE is continuously triggered to switch the power switch 18, as shown by the waveform 38. The voltages VBURH and VBURL are hysteresis boundaries of the hysteresis comparator 24 and generated according to the voltage Burst_level. At time t2, the load transits to light, and consequently the feedback signal Vcomp falls down as shown by the waveform 36. When the feedback signal Vcomp becomes lower than the voltage VBURL, as indicated at time t3, the power converter 10 enters the burst mode. In the burst mode, the mask signal Smask will transit to low once the feedback signal Vcomp becomes lower than the voltage VBURL, and thus mask the clock CLK. The logic level of the mask signal Smask will not return to high unless the feedback signal Vcomp becomes higher than the voltage VBURH, as indicated at time t4. The clock CLK is released when the logic level of the mask signal Smask returns to high. Hence, as indicated between time t3 and time t5, a burst cycle is generated to regulate the output voltage Vo and deliver sufficient output energy.

FIG. 4 is a waveform diagram of the sensing signals Vcs at different input voltages Vin, in which waveform 40 represents the feedback signal Vcomp, waveform 42 represents the sensing signal Vcs at a higher input voltage Vin, and waveform 44 represents the sensing signal Vcs at a lower input voltage Vin. Referring to FIGS. 1 and 4, at higher input voltage Vin, the sensing signal Vcs increases at a higher speed, as shown by the waveform 42; whereas at lower input voltage Vin, the sensing signal Vcs increases at a lower speed, as shown by the waveform 44. After the sensing signal Vcs reaches the level of the feedback signal Vcomp, a propagation delay Tp due to the delay in signal propagation must elapse before the power switch 18 turns off. Since the sensing signal Vcs increases at a higher speed when the input voltage Vin is higher, the sensing signal Vcs in this case will have a higher peak value than that of the case when the input voltage Vin is lower. In other words, the peak value of the current I1 on the primary side of the transformer 14 is higher when the input voltage Vin is higher than when the input voltage Vin is lower. In the burst mode, the current I1 has a minimum pulse $$I1min = (\text{Burst\_level}/Rcs) + (Vin/Lm) \times Tp, \quad [\text{Eq-1}]$$

where Lm is magnetizing inductance of the primary side of the transformer 14. After the power converter 10 enters the burst mode, the average frequency in each burst cycle will fall within an audible noise range of 100 Hz-20 kHz. Therefore, the higher the current I1 is, the louder the audible noise will be. Moreover, the feedback signal Vcomp varies with the peak value of the current I1. FIG. 5 is a waveform diagram showing the burst mode entry points at different input voltages Vin, in which waveform 46 represents the feedback signal Vcomp at a higher input voltage Vin, and waveform 48 represents the feedback signal Vcomp at a lower input voltage Vin. When the input voltage Vin is higher, the peak value of the current I1 is also higher, and in consequence the feedback signal Vcomp will be lower, as shown by the waveform 46. Hence, the power converter 10 enters the burst mode earlier when the input voltage Vin is higher. On the contrary, when the input voltage Vin is lower, the peak value of the current I1 is lower and thus the feedback signal Vcomp will be higher, as shown by the waveform 48. As a result, the burst mode entry point B for the case of lower input voltage Vin comes later than the burst mode entry point A for the case of higher input voltage Vin.

Minimum on-time control can also reduce the switching frequency of the power switch 18 at no load or light load. However, given a constant minimum on-time at light load, the output voltage Vo will have significant ripple when the input voltage Vin is high, and when the input voltage Vin is low, the energy delivery in each cycle the power switch 18 is switched will become inefficient. As a result, it is impossible to significantly reduce the switching frequency. FIG. 6 is a diagram showing the output ripple at different input voltages Vin when given a constant minimum on-time at light load, in which waveform 50 represents the output voltage Vo when the input voltage Vin is 380V, waveform 52 represents the output voltage Vo when the input voltage Vin is 100V, waveform 54 represents the sensing signal Vcs when the input voltage Vin is 380V, and waveform 56 represents the sensing signal Vcs when the input voltage Vin is 100V. As shown by the waveforms 50 and 52, the output ripple is greater when the input voltage Vin is 380V than when the input voltage Vin is 100V.

Further, the peak value of the sensing signal Vcs is smaller when the input voltage Vin is 100V than when the input voltage Vin is 380V, as shown by the waveforms 54 and 56. In other words, when the input voltage Vin is 100V, the current I1 on the primary side of the transformer 14 is lower, and in consequence the mount of energy delivered to a secondary side of the transformer 14 is less.

Therefore, it is desired a control circuit and method to maintain the green mode entry point and modulate the minimum on-time depending on the variation of the input voltage.

SUMMARY OF THE INVENTION

An object of the present invention is to provide a control circuit and method for a flyback power converter.

A flyback power converter includes a power switch connected to a primary side of a transformer, and a sensing signal and a first feedback signal are provided for a control circuit which generates a control signal to switch the power switch so as for the transformer to convert an input voltage into an output voltage. The sensing signal is a function of the input voltage, and the first feedback signal is a function of the output voltage. The control circuit comprises a sampling and holding circuit to extract a variation of the sensing signal during a preset time period, a compensation circuit to compensate the first feedback signal with the variation of the sensing signal to generate a second feedback signal varying with the input voltage, a pulse width modulation circuit to generate the control signal according to a clock, the sensing signal and the second feedback signal, a power-saving circuit to control the flyback power converter to enter a green mode according to the first feedback signal and a preset voltage, and a minimum on-time modulation circuit to determine a minimum on-time of the power switch according to the variation of the sensing signal.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
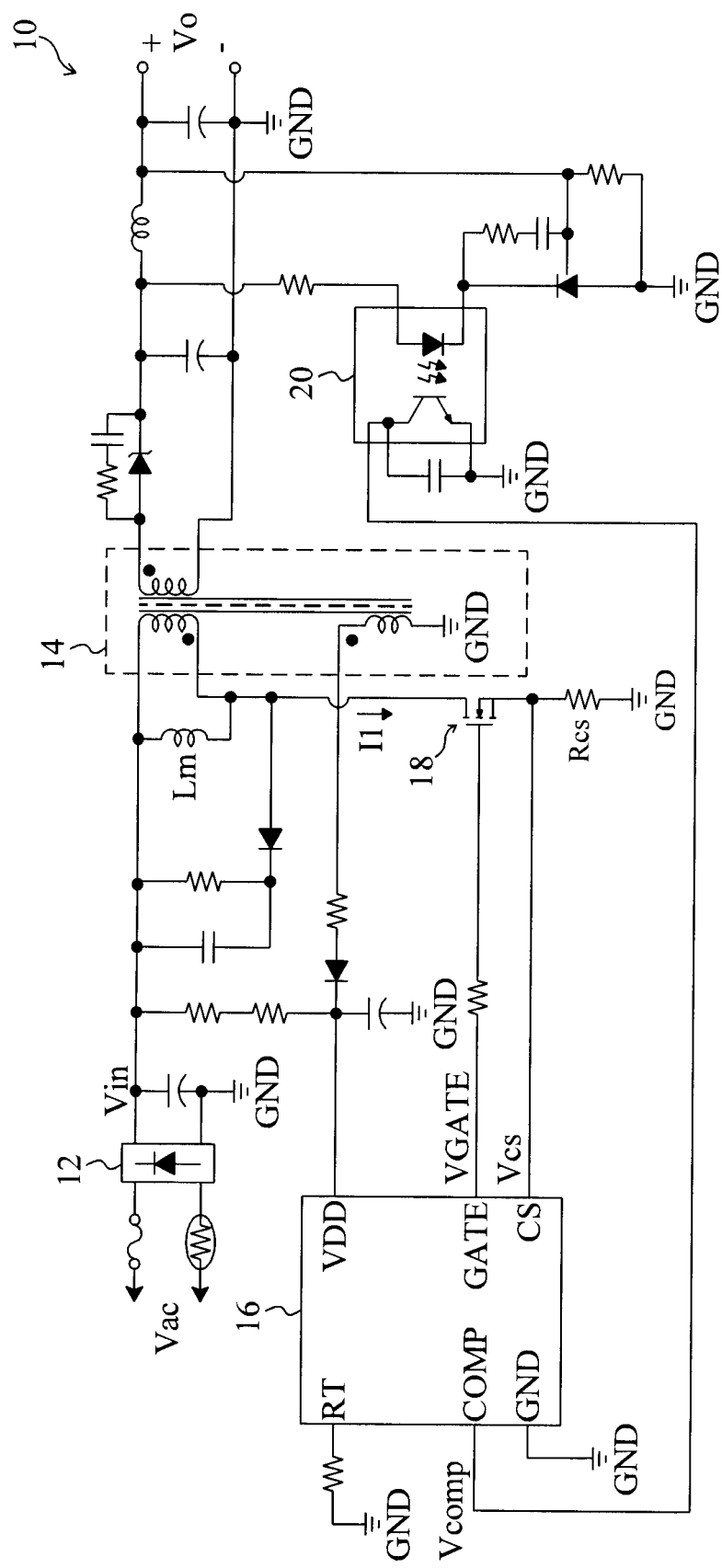
FIG. 1 is a circuit diagram of a conventional current mode flyback power converter.
Figure 2:
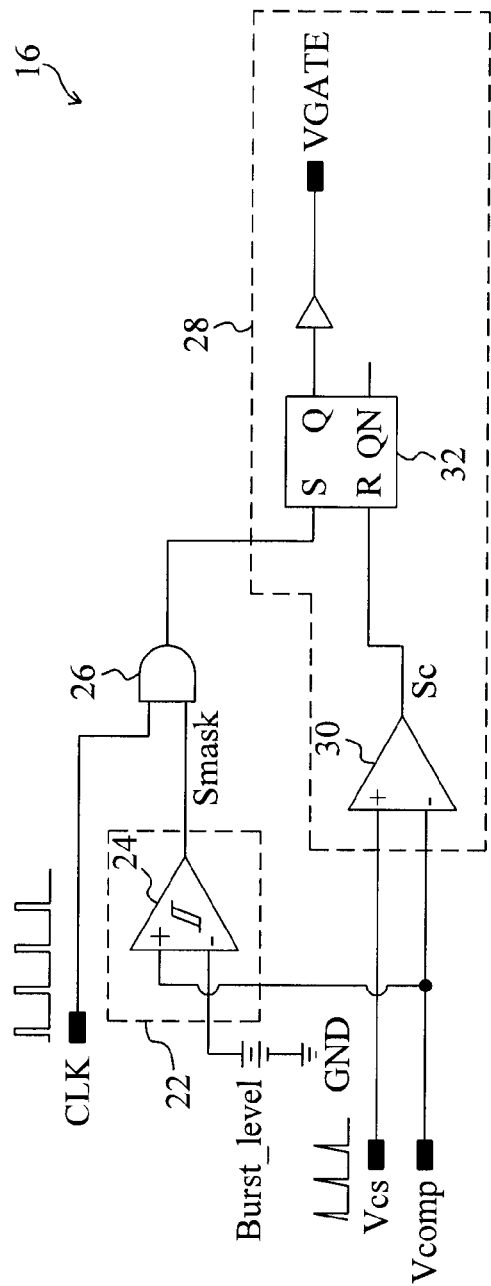
FIG. 2 is a circuit diagram of a conventional control circuit having a burst mode.
Figure 3:
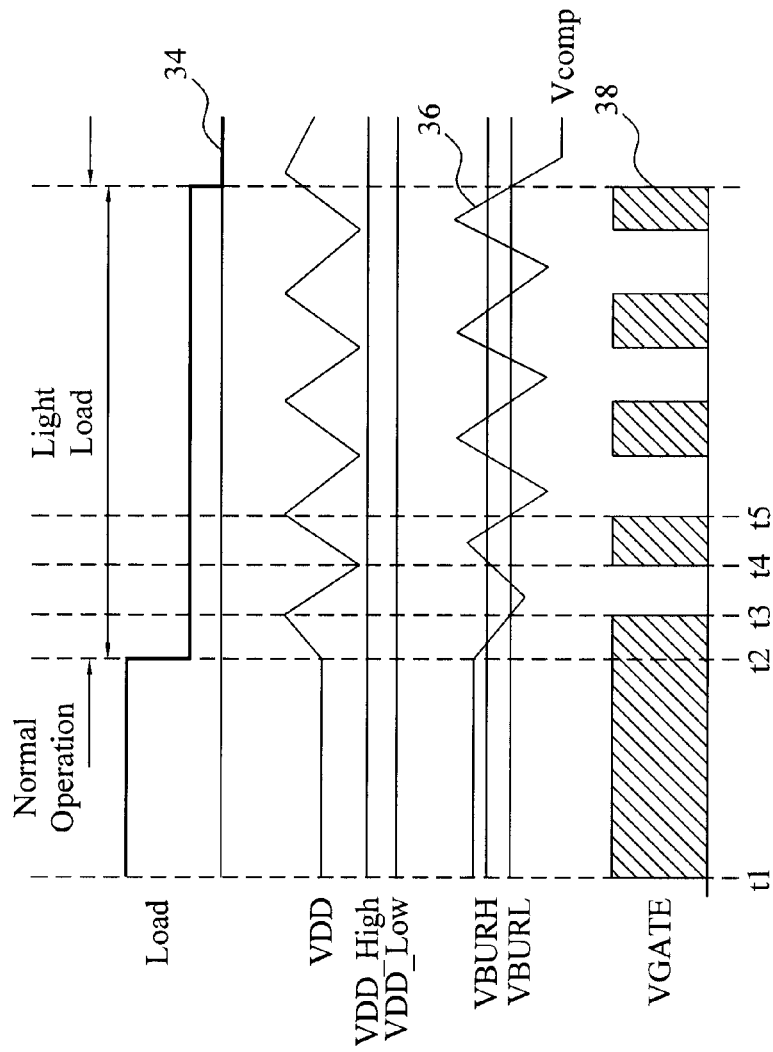
FIG. 3 is waveform diagram of the control circuit 16 shown in FIG. 2.
Figure 4:
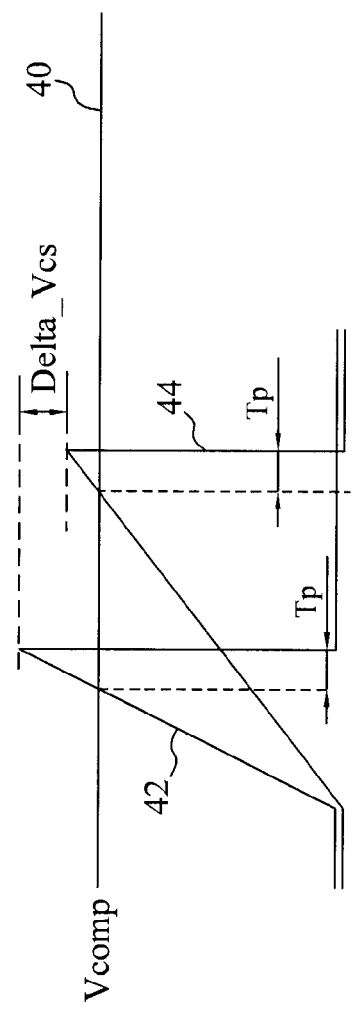
FIG. 4 is a waveform diagram of the sensing signals at different input voltages.
Figure 5:
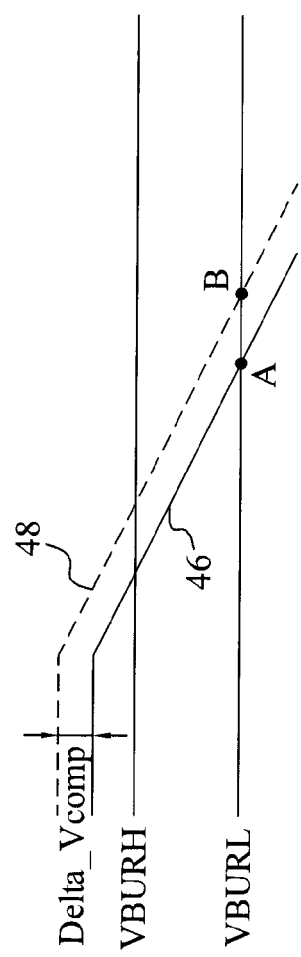
FIG. 5 is a waveform diagram showing the burst mode entry points at different input voltages.
Figure 6:
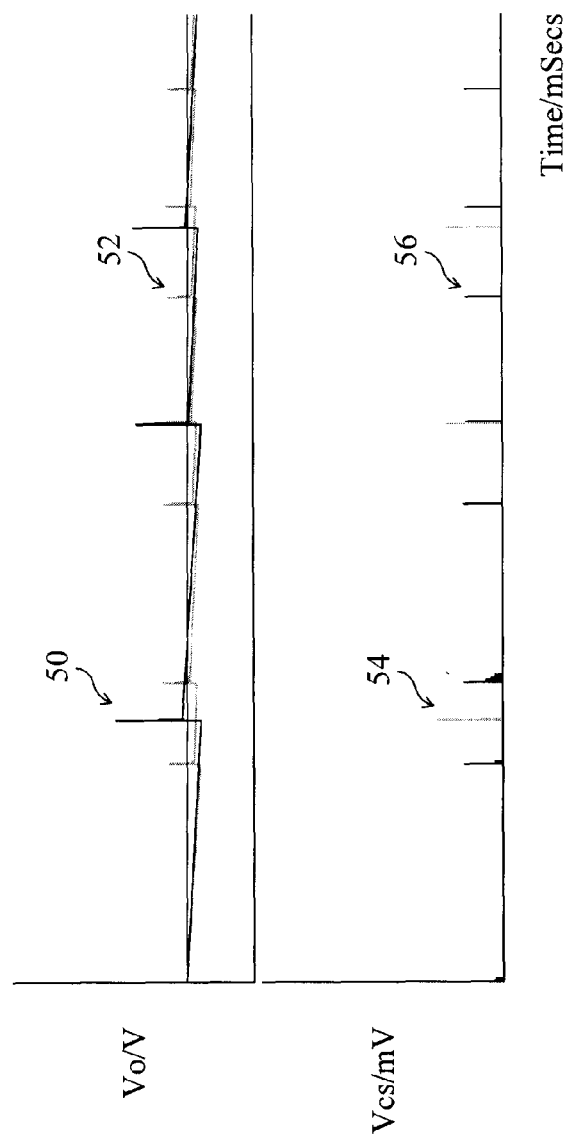
FIG. 6 is a diagram showing the ripple of the output voltage at different input voltages when given a constant minimum on-time at light load.
Figure 7:
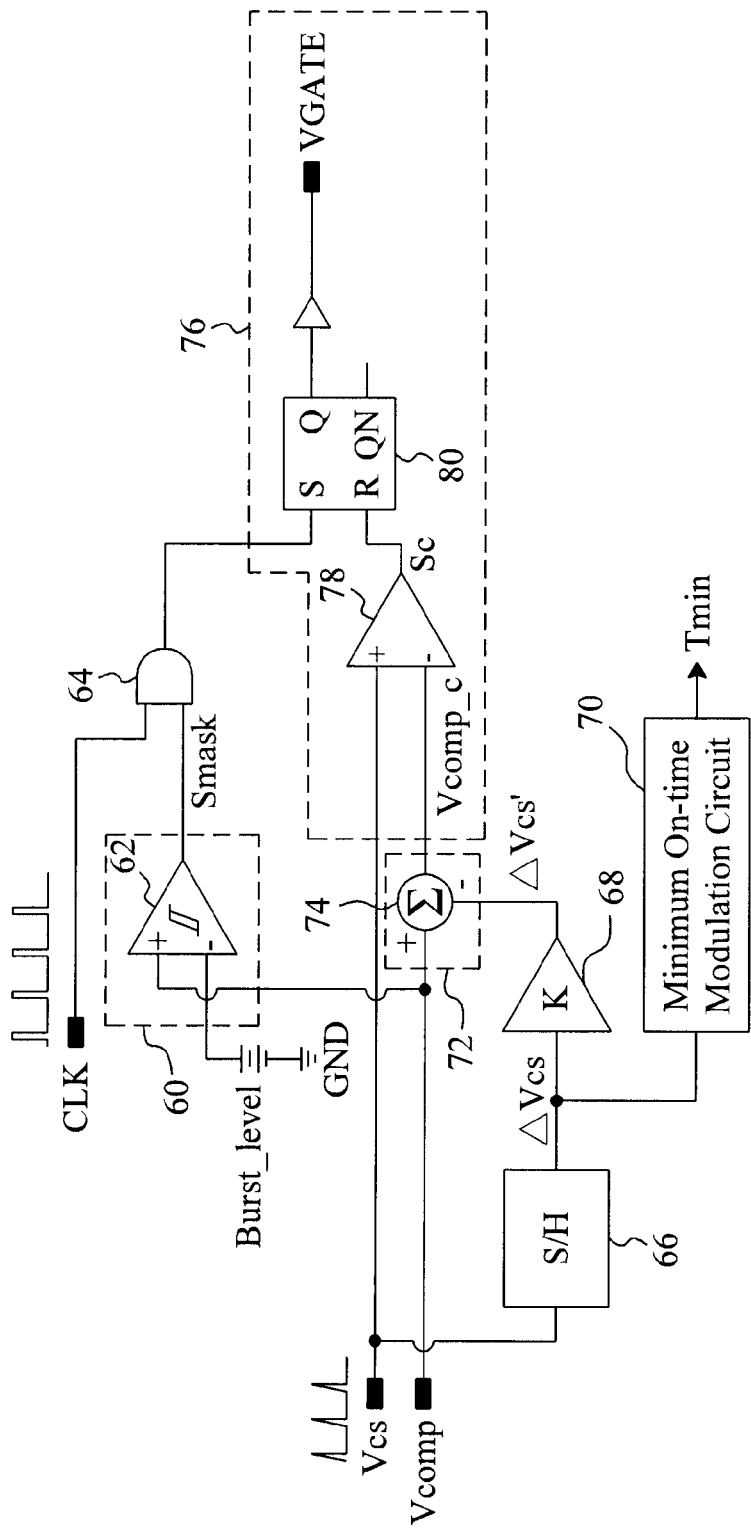
FIG. 7 is a circuit diagram of a control circuit for a flyback power converter in a first embodiment according to the present invention.

Referring to FIG. 1, it is well known in the art that the variation of the sensing signal Vcs during a preset time period $\Delta$ton can be expressed as $$\Delta Vcs = (Vin/Lm) \times \Delta ton \times Rcs, \quad \text{[Eq-2]}$$

which shows the variation $\Delta$Vcs of the sensing signal Vcs is proportional to the input voltage Vin. Therefore, by multiplying the variation $\Delta$Vcs of the sensing signal Vcs with a proper coefficient $$K = Tp/\Delta ton, \quad \text{[Eq-3]}$$

the impact of signal propagation delay in the equation Eq-1, i.e., (Vin/Lm)×Tp, can be eliminated so that the current I1 on the primary side of the transformer 14 has substantially the same peak value regardless whether the input voltage Vin is high or low, and in consequence audible noise is reduced. FIG. 7 is a circuit diagram of a control circuit for a flyback power converter in a first embodiment according to the present invention, in which a power-saving circuit 60 includes a hysteresis comparator 62 to generate a mask signal Smask according to a preset voltage Burst_level and a feedback signal Vcomp to mask a clock CLK by an AND gate 64, the feedback signal Vcomp is a function of the output voltage Vo as shown in FIG. 1, a sampling and holding circuit 66 extracts a variation $\Delta$Vcs of a sensing signal Vcs during a preset time period $\Delta$ton, the sensing signal Vcs is a function of the input voltage Vin as shown in FIG. 1, a gain stage 68 multiplies the variation $\Delta$Vcs of the sensing signal Vcs with the coefficient K designated in the equation Eq-3 to generate a gain signal $\Delta$Vcs', and a compensation circuit 72 includes an adder 74 to subtract the gain signal $\Delta$Vcs' from the feedback signal Vcomp to generate a compensated feedback signal Vcomp_c. Since the variation $\Delta$Vcs of the sensing signal Vcs is proportional to the input voltage Vin, the compensated feedback signal Vcomp_c is varying with the input voltage Vin. A minimum on-time modulation circuit 70 determines the minimum on-time Tmin of the power switch 18 shown in FIG. 1 according to the variation $\Delta$Vcs of the sensing signal Vcs. A pulse width modulation circuit 76 includes a comparator 78 to generate a comparison signal Sc according to the compensated feedback signal Vcomp_c and the sensing signal Vcs, and a flip-flop 80 to generate a control signal VGATE according to an output of the AND gate 64 and the comparison signal Sc to switch the power switch 18. In this embodiment, with the compensation, the current I1 will have a same peak value at different input voltages Vin, and thus the feedback signal Vcomp remains the same at different input voltages Vin. As a result, the burst mode entry point of the flyback power converter will not change with the input voltage Vin.

Figure 8:
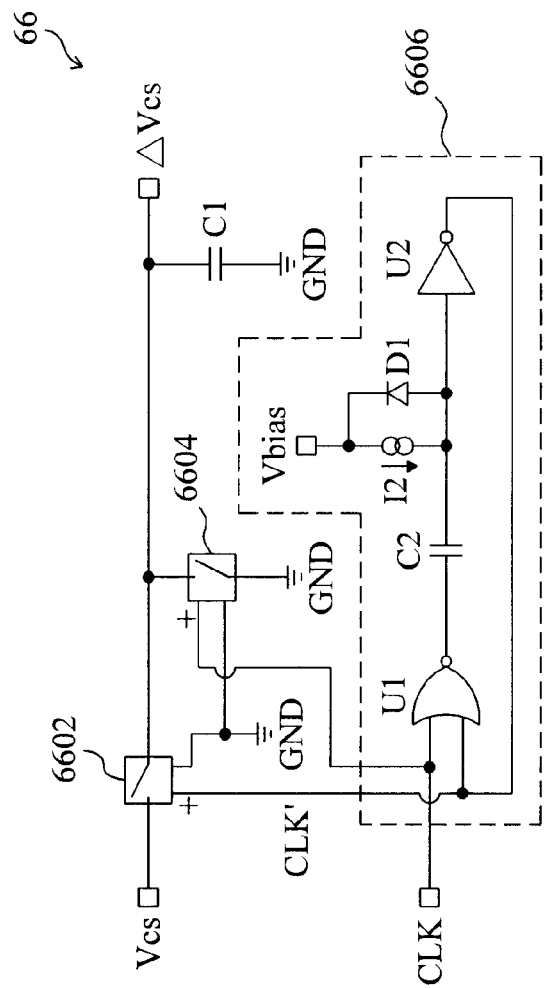
FIG. 8 is a circuit diagram of an embodiment for the sampling and holding circuit shown in FIG. 7.
Figure 9:
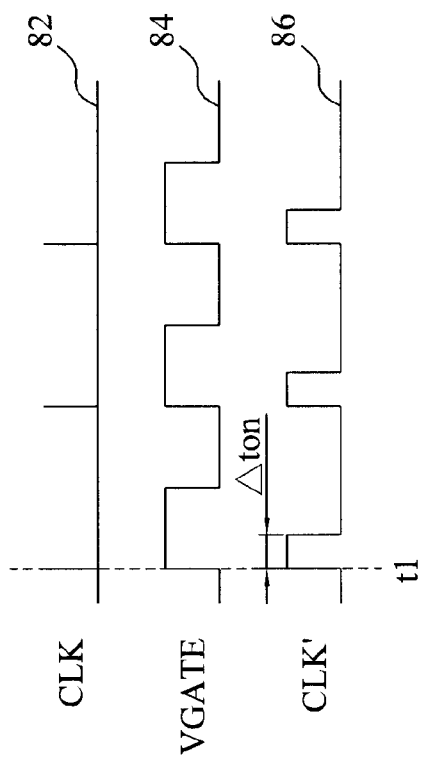
FIG. 9 is a waveform diagram of the sampling and holding circuit shown in FIG. 8.
Figure 10:
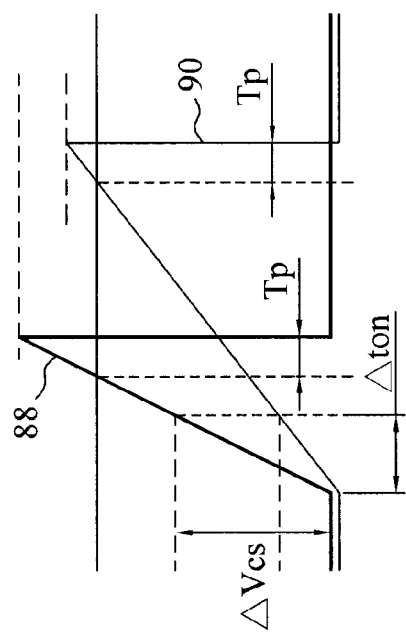
FIG. 10 is a waveform diagram of the variation of the sensing signal at different input voltages.

FIG. 8 is a circuit diagram of an embodiment for the sampling and holding circuit 66, in which a constant on-time generator 6606 generates a clock CLK' according to the clock CLK, the clock CLK' has a constant on-time equal to $\Delta$ton, a switch 6602 is serially connected to a capacitor C1 and controlled by the clock CLK', and a switch 6604 is shunt to the capacitor C1 and controlled by the clock CLK. FIG. 9 is a waveform diagram of the sampling and holding circuit shown in FIG. 8, in which waveform 82 represents the clock CLK, waveform 84 represents the control signal VGATE, and waveform 86 represents the clock CLK'. Referring to FIGS. 7, 8 and 9, when the clock CLK transits to high, as indicated by time t1 in FIG. 9, the control signal VGATE turns on the power switch 18, as shown by the waveform 84, so that the sensing signal Vcs begins to increase. Meantime, the switch 6604 in the sampling and holding circuit 66 is also turned on to reset the capacitor C1. According to the clock CLK, the constant on-time generator 6606 generates the clock CLK' as shown by the waveform 86, which is used to turn on the switch 6602, and in consequence the sensing signal Vcs will charge the capacitor C1. After the preset time period Δton, the switch 6602 is turned off, thereby extracting the variation ΔVcs of the sensing signal Vcs during the preset time period Δton. FIG. 10 is a waveform diagram of the variation ΔVcs of the sensing signal Vcs at different input voltages Vin, in which waveform 88 represents the sensing signal Vcs at a higher input voltage Vin, and waveform 90 represents the sensing signal Vcs at a lower input voltage Vin. When the input voltage Vin is higher, the sensing signal Vcs increases at a higher speed, as shown by the waveform 88, so that a larger variation ΔVcs will be obtained. On the contrary, when the input voltage Vin is lower, the sensing signal Vcs increases at a lower speed, as shown by the waveform 90, so that the variation ΔVcs will be smaller.

Figure 11:
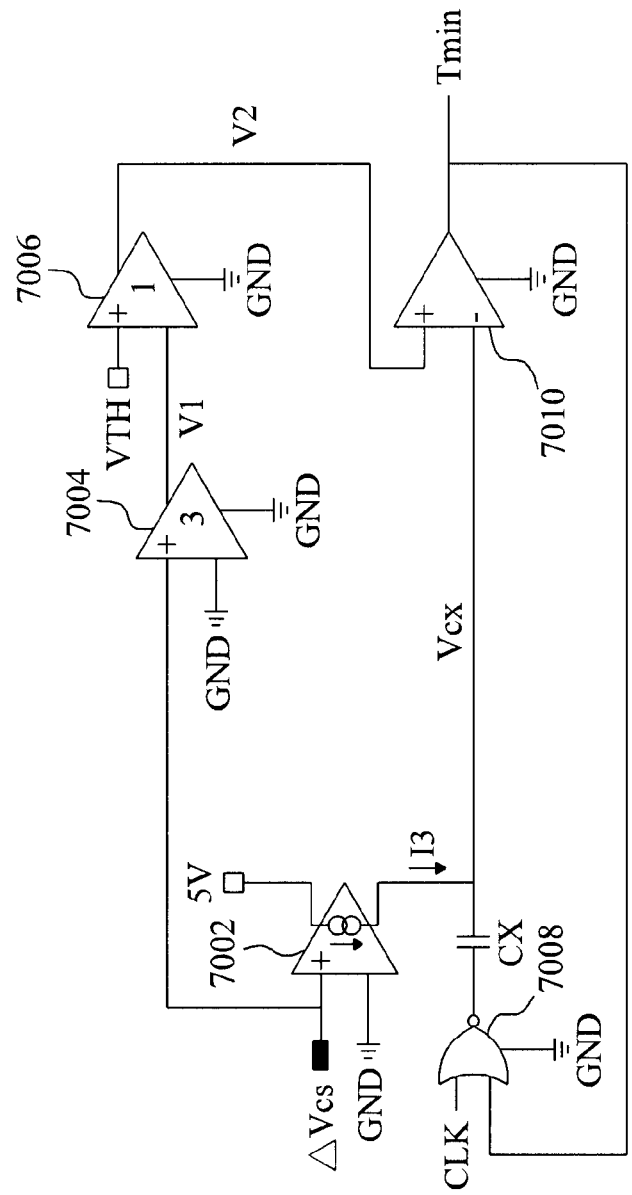
FIG. 11 is a circuit diagram of an embodiment for the minimum on-time modulation circuit shown in FIG. 7.

At light load, the flyback power converter 10 operates in a discontinuous conduction mode (DCM). In order for a same output ripple regardless of the input voltage Vin being high or low, it is necessary to control the peak value of the current I1 on the primary side of the transformer 14 at a constant value. FIG. 11 is a circuit diagram of an embodiment for the minimum on-time modulation circuit shown in FIG. 7, in which a voltage-to-current converter 7002 converts the variation ΔVcs of the sensing signal Vcs into a current I3 to charge a capacitor CX to generate a voltage Vcx, an error amplifier 7004 amplifies the variation ΔVcs threefold to generate a voltage V1, an error amplifier 7006 generates a voltage V2 according to a preset voltage VTH and the voltage V1, a comparator 7010 compares the voltage V2 with the voltage Vcx to determine the minimum on-time Tmin of the power switch 18, and a NOR gate 7008 controls the charging and discharging of the capacitor CX according to the clock CLK and the signal Tmin. Referring to FIG. 10, when the input voltage Vin is higher, the variation ΔVcs is larger, and therefore the current I3 is also greater. As a result, the voltage Vcx reaches the level of the voltage V2 earlier so that the minimum on-time Tmin is shorter. On the contrary, when the input voltage Vin is lower, the variation ΔVcs is smaller and the current I3 is smaller, too. Hence, the voltage Vcx reaches the level of the voltage V2 later, and the minimum on-time Tmin is longer. Therefore, the peak value of the current I1 on the primary side of the transformer 14 remains the same at different input voltages Vin. That is, the amount of energy delivered to the secondary side of the transformer 14 will be the same. Besides, the same peak value of the current I1 also means the same volt-sec value.

Figure 12:
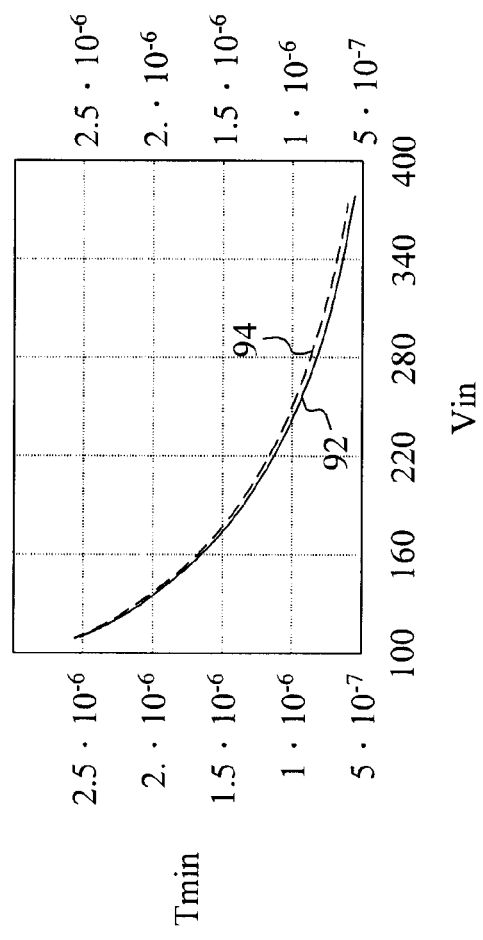
FIG. 12 is a diagram showing a relationship between the minimum on-time and the input voltage.

FIG. 12 is a diagram showing a relationship between the minimum on-time Tmin and the input voltage Vin, in which the X-axis represents the input voltage Vin, and the Y-axis represents the minimum on-time Tmin. If the propagation delay Tp and the minimum on-time Tmin_max at the maximum input voltage $Vin_{max}$ are known, the minimum on-time resulting in the same peak value of the current I1 at different input voltages Vin can be expressed as $$Tmin=\{[Vin_{max} \times (Tmin\_max+Tp)]/Vin\}-Tp. \quad [\text{Eq-4}]$$

The relationship between the input voltage Vin and the minimum on-time Tmin following the equation Eq-4 is shown by curve 92 in FIG. 12, wherein the input voltage Vin ranges from 100V to 380V. It may be obtained from FIG. 11 by one skilled in the art, the minimum on-time modulation circuit 70 will generate the minimum on-time $$Tmin=[CX(VTH-\Delta Vcs \times 3)]/(Gm \times \Delta Vcs), \quad [\text{Eq-5}]$$

where Gm is a transcductive coefficient of the voltage-to-current converter 7002. In addition, the capacitor CX has the capacitance $$CX=Vin\max[(Tmin\_max+Tp)Tp \times 3Rcs \times Gm]/(V2 \times Lm). \quad [\text{Eq-6}]$$

By simulating the minimum on-time modulation circuit 70, the relationship between the minimum on-time Tmin and the input voltage Vin is also obtained, as shown by curve 94 in FIG. 12. It can be seen in FIG. 12 that the curves 92 and 94 almost overlap to each other. Thus, the minimum on-time Tmin provided by the minimum on-time modulation circuit 70 is capable of rendering the peak value of the current I1 substantially constant at different input voltages Vin.

Figure 13:
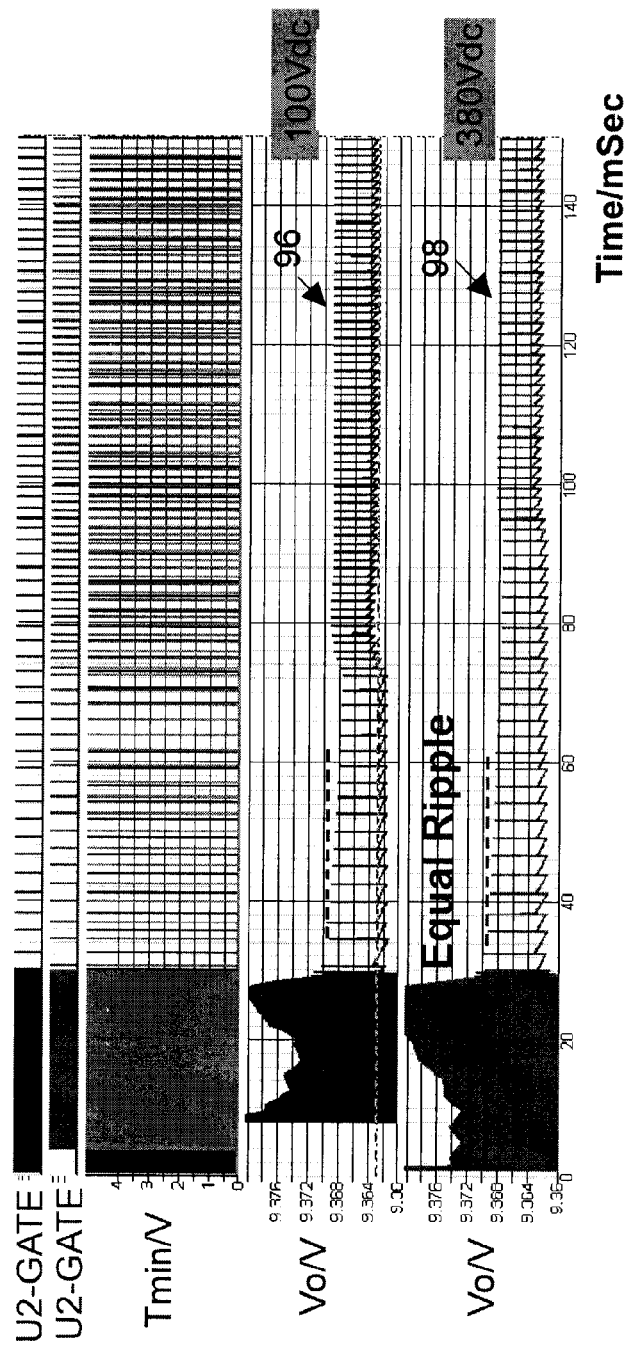
FIG. 13 is a diagram showing a simulation of output ripple when a flyback power converter using the minimum on-time modulation circuit of FIG. 11.

FIG. 13 is a diagram showing a simulation of the output ripple when the flyback power converter 10 using the minimum on-time modulation circuit 70 of FIG. 11, in which waveform 96 represents the output voltage Vo when the input voltage Vin is 100V, and waveform 98 represents the output voltage Vo when the input voltage Vin is 380V. When using the minimum on-time modulation circuit 70 shown in FIG. 11, the flyback power converter 10 has substantially the same output ripple when the input voltage Vin is 100V and 380V. As mentioned previously, when the input voltage Vin is higher, the minimum on-time modulation circuit 70 will shorten the minimum on-time Tmin so that the output ripple is reduced. On the contrary, when the input voltage is lower, the minimum on-time modulation circuit 70 will extend the minimum on-time Tmin so as to deliver sufficient energy. In consequence, the number of the switching times of the power switch 18 is reduced, and so is the switching loss thereof.

Figure 14:
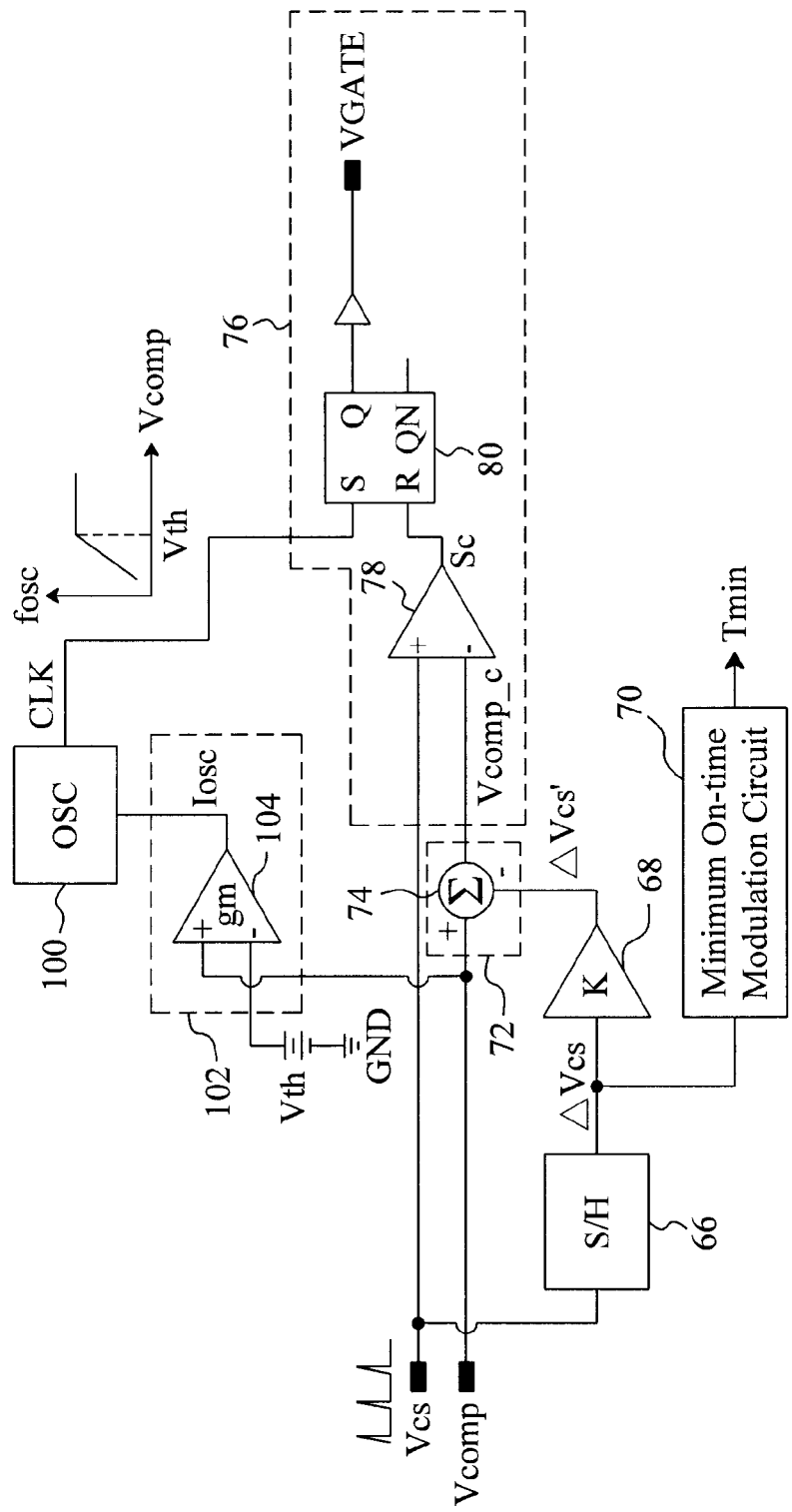
FIG. 14 is a circuit diagram of a control circuit for a flyback power converter in a second embodiment according to the present invention.

FIG. 14 is a circuit diagram of a control circuit for a flyback power converter in a second embodiment according to the present invention, which is similar to its counterpart in the first embodiment in including the sampling and holding circuit 66, the gain stage 68, the minimum on-time modulation circuit 70, the compensation circuit 72, and the pulse width modulation circuit 76. However, in this embodiment, the control circuit comprises a power-saving circuit 102 that includes a transcductive amplifier 104 having two inputs to receive the feedback signal Vcomp and a preset voltage Vth, respectively, and an output connected to an oscillator 100 to provide the clock CLK. When the feedback signal Vcomp is greater than the preset voltage Vth, the frequency fosc of the clock CLK remains constant; when the feedback signal Vcomp is smaller than the preset voltage Vth, the control circuit enters a variable frequency mode, in which the transconductive amplifier 104 generates a modulation signal Iosc for the oscillator 100 to modulate the frequency fosc of the clock CLK. As a result, the frequency fosc of the clock CLK increases or decreases as the feedback signal Vcomp rises or falls. With the compensation, the peak value of the current I1 will remain constant at different input voltages Vin, and thus the feedback signal Vcomp will be the same at different input voltages Vin. As a result, the entry point into the variable frequency mode does not change with the input voltage Vin.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A control circuit for a flyback power converter including a transformer and a power switch connected to a primary side of the transformer, to switch the power switch so as for the transformer to convert an input voltage into an output voltage, the control circuit comprising:
   a sampling and holding circuit extracting a variation of a sensing signal during a preset time period, wherein the sensing signal is a function of the input voltage;
   a compensation circuit connected to the sampling and holding circuit, compensating a first feedback signal according to the variation of the sensing signal to generate a second feedback signal varying with the input voltage, wherein the first feedback signal is a function of the output voltage;
   a pulse width modulation circuit connected to the compensation circuit, determining an on-time of the power switch according to the sensing signal and the second feedback signal; and
   a minimum on-time modulation circuit connected to the sampling and holding circuit, modulating a minimum on-time of the power switch according to the variation of the sensing signal,
   whereby the minimum on-time of the power switch is modulated according to a variation of the input voltage.

2. The control circuit of claim 1, wherein the sampling and holding circuit comprises:
   a first switch;
   a capacitor connected to the first switch;
   a second switch shunt to the capacitor, being switched by a first clock to reset the capacitor; and
   a constant on-time generator connected to the first switch, generating a second clock having a constant on-time equal to the preset time period according to the first clock, to switch the first switch for the sensing signal to charge the capacitor to obtain the variation of the sensing signal.

3. The control circuit of claim 1, further comprising a gain stage connected to the sampling and holding circuit, generating a gain signal proportional to the variation of the sensing signal.

4. The control circuit of claim 3, wherein the compensation circuit comprises an adder connected to the gain stage, subtracting the gain signal from the first feedback signal to generate the second feedback signal.

5. The control circuit of claim 1, wherein the pulse width modulation circuit comprises:
   a comparator connected to the compensation circuit, comparing the sensing signal with the second feedback signal to generate a comparison signal; and
   a flip-flop having a setting input to receive a clock, a resetting input to receive the comparison signal, and an output to provide a control signal to switch the power switch.

6. The control circuit of claim 5, further comprising a hysteresis comparator generating a mask signal according to the first feedback signal and a preset voltage to mask the clock.

7. The control circuit of claim 5, further comprising a transconductive amplifier to modulate a frequency of the clock according to the first feedback signal and a preset voltage.

8. The control circuit of claim 1, wherein the minimum on-time modulation circuit comprises:
   a capacitor;
   a current source connected to the capacitor and the sampling and holding circuit, providing a current varying with the variation of the sensing signal to charge the capacitor to generate a first signal;
   an error amplifier connected to the sampling and holding circuit, generating a second signal according to the variation of the sensing signal and a preset voltage; and
   a comparator connected to the capacitor and error amplifier, determining the minimum on-time of the power switch according to the first and second signals.

9. A control circuit for a flyback power converter including a transformer and a power switch connected to a primary side of the transformer, to switch the power switch so as for the transformer to convert an input voltage into an output voltage, the control circuit comprising:
   a sampling and holding circuit extracting a variation of a sensing signal during a preset time period, wherein the sensing signal is a function of the input voltage; and
   a minimum on-time modulation circuit connected to the sampling and holding circuit, modulating a minimum on-time of the power switch according to the variation of the sensing signal,
   whereby the minimum on-time of the power switch is modulated according to a variation of the input voltage.

10. The control circuit of claim 9, wherein the minimum on-time modulation circuit comprises:
    a capacitor;
    a current source connected to the capacitor and the sampling and holding circuit, providing a current varying with the variation of the sensing signal to charge the capacitor to generate a first signal;
    an error amplifier connected to the sampling and holding circuit, generating a second signal according to the variation of the sensing signal and a preset voltage; and
    a comparator connected to the capacitor and error amplifier, determining the minimum on-time of the power switch according to the first and second signals.

11. A control method for a flyback power converter including a transformer and a power switch connected to a primary side of the transformer to be switched so as for the transformer to convert an input voltage into an output voltage, the control method comprising:
    providing a sensing signal which is a function of the input voltage;
    providing a first feedback signal which is a function of the output voltage; sampling and holding the sensing signal to extract a variation of the sensing signal during a preset time period;
    generating a second feedback signal varying with the input voltage by compensating the first feedback signal with the variation of the sensing signal;
    determining an on-time of the power switch according to the sensing signal and the second feedback signal; and
    modulating a minimum on-time of the power switch according to the variation of the sensing signal,
    whereby the minimum on-time of the power switch is modulated according to a variation of the input voltage.

12. The control method of claim 11, wherein the step of sampling and holding the sensing signal comprises:
    providing a first clock;

according to the first clock, generating a second clock having a constant on-time;

using the second clock to switch a first switch serially connected to a capacitor for the sensing signal to charge the capacitor to obtain the variation of the sensing signal; and using the first clock to switch a second switch shunt to the capacitor to reset the capacitor.

13. The control method of claim 11, wherein the step of generating a second feedback signal varying with the input voltage comprises:

generating a gain signal proportional to the variation of the sensing signal; and subtracting the gain signal from the first feedback signal to generate the second feedback signal.

14. The control method of claim 11, wherein the step of determining an on-time of the power switch comprises:

triggering the on-time of the power switch in response to a clock; and terminating the on-time of the power switch when the sensing signal reaches the second feedback signal.

15. The control method of claim 14, further comprising generating a mask signal according to the first feedback signal and a preset voltage to mask the clock.

16. The control method of claim 14, further comprising generating a modulation signal according to the first feedback signal and a preset voltage to modulate a frequency of the clock.

17. The control method of claim 11, wherein the step of modulating a minimum on-time of the power switch comprises:

providing a current varying with the variation of the sensing signal to charge a capacitor to generate a first signal;

generating a second signal according to a difference between the variation of the sensing signal and a preset voltage; and determining the minimum on-time of the power switch according to the first and second signals.

18. A control method for a flyback power converter including a transformer and a power switch connected to a primary side of the transformer to be switched so as for the transformer to convert an input voltage into an output voltage, the control method comprising:

providing a sensing signal which is a function of the input voltage;

sampling and holding the sensing signal to extract a variation of the sensing signal during a preset time period; and modulating a minimum on-time of the power switch according to the variation of the sensing signal, whereby the minimum on-time of the power switch is modulated according to a variation of the input voltage.

19. The control method of claim 18, wherein the step of modulating a minimum on-time of the power switch comprises:

providing a current varying with the variation of the sensing signal to charge a capacitor to generate a first signal;

generating a second signal according to a difference between the variation of the sensing signal and a preset voltage; and determining the minimum on-time of the power switch according to the first and second signals.

* * * * *